United States Patent [19]

Blake

[11] Patent Number: 4,492,251
[45] Date of Patent: Jan. 8, 1985

[54] FLUID CONTROL SYSTEM FOR TWO INDEPENDENT ACTUATORS

[75] Inventor: William W. Blake, Kewanee, Ill.
[73] Assignee: Caterpillar Tractor Co., Peoria, Ill.
[21] Appl. No.: 334,418
[22] Filed: Dec. 24, 1981
[51] Int. Cl.³ .............................................. F16K 11/04
[52] U.S. Cl. ......................... 137/596.16; 137/596.18;
  192/87.14; 192/4 C; 192/3.57
[58] Field of Search ...................... 137/596.14, 596.16,
  137/596.18; 192/3.57, 4 C, 87.14, 87.15, 87.16,
  87.17, 87.18, 87.19; 74/866, 867, 752 A, 733

[56] References Cited

U.S. PATENT DOCUMENTS

| | | | |
|---|---|---|---|
| 2,952,246 | 9/1960 | Collins | 137/596.16 |
| 3,199,647 | 8/1965 | Staab | 192/87.19 |
| 3,294,120 | 11/1966 | Ruchser | 137/596.16 |
| 3,757,822 | 9/1973 | Kell | 192/51 X |
| 3,910,389 | 10/1975 | Pleier | 192/4 C |
| 3,918,488 | 11/1975 | Minami | 137/596.16 |

Primary Examiner—Randall L. Green
Assistant Examiner—Carl D. Price
Attorney, Agent, or Firm—John W. Grant

[57] ABSTRACT

A fluid control system (10) for two independent actuators or clutches (11,12) has a pair of normally open solenoid valves (44,46) for controlling fluid pressure in a pair of actuating chambers (31,32). This controls actuation of a pair of directional spools (26,27) which in turn controls engagement and disengagement of the clutches (11,12) such that failure of one of the solenoid valves to close properly would not cause unexpected engagement of the associated clutch. A shuttle spool (59) is movable in response to pressurization of one of the actuating chambers (31,32) to a position for venting the other actuating chamber (31,32) thereby preventing simultaneous engagement of both clutches.

6 Claims, 1 Drawing Figure

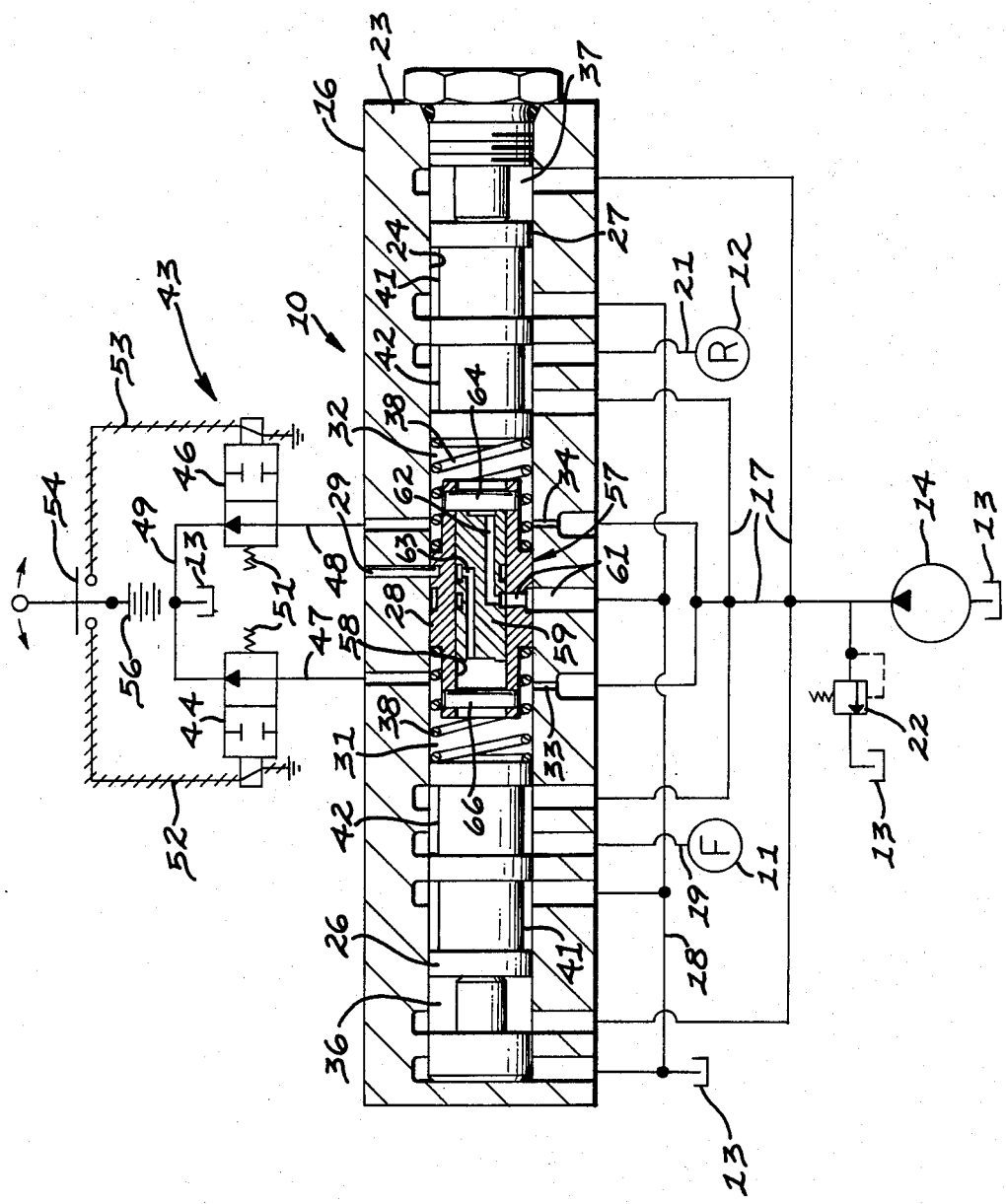

FLUID CONTROL SYSTEM FOR TWO INDEPENDENT ACTUATORS

DESCRIPTION

1. Technical Field

This invention relates generally to a fluid control system for selectively controlling the actuation of two independent actuators and more particularly to such a system which prevents simultaneous actuation of both actuators.

2. Background Art

One control arrangement for a single speed transmission having independently actuatable forward and reverse clutches has a control valve with a pair of directional spools for selectively actuating the clutches. Each of the directional spools are moved to a position for actuating the associated clutch by venting pressurized fluid from a chamber at one end of the associated spool through a solenoid valve. The solenoid valve is normally spring biased to the closed position to cause the chamber to become pressurized and is moved to the open or venting position upon energizing the coil thereof.

One of the problems encountered with such control arrangement is that ocassionally one of the solenoid valves may not close completely due to oil borne contaminants. This is the normal failure mode of the normally closed solenoid valve and will sometimes allow the fluid pressure in the associated actuating chamber to leak sufficiently for the clutch to engage thereby causing unexpected movement of the vehicle. Moreover, if the other solenoid is then actuated, then both clutches could be engaged at the same time thereby locking the transmission in a neutral condition. If the one clutch that is engaged due to a leaky solenoid valve is only partially engaged and the other clutch is fully engaged, slippage of the partially engage clutch could occur causing serious damage thereto.

The present invention is directed to overcoming one or more of the problems as set forth above.

DISCLOSURE OF THE INVENTION

In one aspect of the present invention a fluid control system for selectively controlling actuation of two independent actuators comprises a reservoir; a pump connected to the reservoir; a control valve having a pair of directional spools slidably positioned therein, and a pair of actuating chambers each being disposed at one end of one of the directional spools, each of said directional spools being movable between a first position at which the pump is in communication with one of the actuators and a second position at which said one of the actuators is in communication with the reservoir, each of said directional valves being moved to its first position in response to the associated actuating chamber being pressurized; means for selectively pressurizing the actuating chambers; and means for venting one of the actuating chambers to the reservoir in response to the other actuating chamber being pressurized so that both of said actuating chambers cannot be pressurized for moving the directional spools to the first positions at the same time.

The problem of unexpected clutch engagement caused by a leaky solenoid valve is solved by the use of a fluid control system with which each of the clutches is normally selectively engaged by the shifting of a solenoid valve from a normally open position to a closed position. Thus, since clutch disengagement is caused by the solenoid valve being open, if one of the solenoid valves should develop a leak therein the associated clutch would automatically become disengaged. Also the problem of inadvertent simultaneous engagement of both clutches is solved by the use of the means for venting one of the chambers to a reservoir in response to the other chamber being pressurized. Thus, with one of the chambers vented to the reservoir, pressure sufficient for moving the directional spool to a clutch engaged position can not be established within that chamber.

BRIEF DESCRIPTION OF THE DRAWINGS

The sole FIGURE is a schematic of an embodiment of the present invention with portions shown in cross section.

BEST MODE FOR CARRYING OUT THE INVENTION

Referring now to the drawing a fluid control system is generally indicated by the reference numeral 10 and selectively controls actuation of two independent actuators 11,12. The actuators in the embodiment shown are forward and reverse clutches, respectively, of the type which are engaged by fluid pressure directed thereto and disengaged when the pressurized fluid is vented therefrom. The fluid control system 10 includes a reservoir 13, a pump 14 connected to the reservoir, and a control valve 16 connected to the output of the pump 14 through a branched pressure conduit 17 and to the reservoir 13 through a drain conduit 18. A pair of motor conduits 19,21 connect the control valve 16 with the forward and reverse clutches 11,12 respectively. A pressure regulator valve 22 is connected to the pressure conduit 17.

The control valve 16 includes a valve body 23 having a bore 24 therein. A pair of directional spools 26,27 are slidably positioned within the bore 24 on opposite sides of a central member 28. The central member 28 is fixedly positioned by a retainer pin 29 and forms a pair of variable volume actuating chambers 31,32 in the bore 24 between the central member and the directional spools 26,27 respectively. The pressure conduit 17 is connected to the first and second actuating chambers 31,32 through orifices 33 and 34. Another pair of chambers 36,37 are formed at the opposite end of the directional spools 26,27 and are in continuous communication with the pressure conduit 17. Each of the actuating chambers 31,32 has a spring 38 positioned therein for urging the associated directional spool 26 or 27 in a direction away from the central member 28. The directional spools 26,27 have a pair of annular grooves 41,42 formed therein.

The fluid control system 10 also includes a means 43 for selectively pressurizing the actuating chambers 31,32. The means 43 includes a pair of two position solenoid actuated valves 44,46 connected to the actuating chambers 31,32 respectively through conduits 47,48 and to the reservoir 13 through a conduit 49. Each of the solenoid valves 44,46 is normally biased to the open position shown by a spring 51. A pair of electrical lines 52,53 connect the solenoid valves to the output terminals of a switch 54 which in turn has its input terminal connected to a storage battery 56.

The fluid control system 10 further includes a means 57 for venting one of the actuating chambers 31,32 to the reservoir 13 in response to the other of the actuating chambers 31,32 being pressurized so that both of the actuating chambers 31,32 cannot be pressurized at the same time. The means 57 includes a bore 58 in the central member 28 and an interlock shuttle spool 59 slidably positioned within the bore 58. A vent passageway 61 in the central member 28 and valve body 23 connects the bore 58 with the drain conduit 18 and hence the reservoir 13. The shuttle spool 59 has first and second orificed passageways 62,63 in communication with the actuating chambers 32 and 31 respectively. A first retainer pin 64 connected to the central member 28 limits movement of the shuttle valve in a first direction so that the first orificed passageway 62 is in communication with the vent passage 61. A second retainer pin 66 connected to the central member 28 limits movement of the shuttle spool 59 in the opposite direction at a position at which the second orificed passageway 63 is in communication with the vent passage 61. Preferably, the orificed passageways 62,63 are substantially equal to or larger than the orifices 33,34.

INDUSTRIAL APPLICABILITY

In the operation of the fluid control system 10, each of the directional spools 26,27 is movable between a first position at which the pressure conduit 17 is in communication with the clutch 11 or 12 through the annular groove 42 and a second position at which the clutch 11 or 12 is in communication with the drain conduit 18 through the annular groove 41. At the first position of each directional spool 26,27, the clutch 11 or 12 is blocked from communication with the drain conduit 18. At the second position of each directional spool 26,27 the clutch 11 or 12 is blocked from communication with the pressure conduit 17.

Each of the solenoid valves 44,46 is movable between a first position at which the actuating chambers 31 or 32 are in communication with the reservoir 13 and a second position at which communication between the actuating chambers 31 or 32 and the reservoir 13 is blocked. The springs 51 biases the solenoid valves to the first position.

The shuttle spool 59 is movable between a first position at which the actuating chamber 32 is in communication with the reservoir 13 through the first orificed passageway 62, vent passageway 61, and the drain conduit 18, and a second position at which the other actuating chamber 31 is in communication with the reservoir 13 through the second orificed passageway 63, vent passageway 61 and the drain conduit 18.

The solenoid valves 44,46 and directional spools 26,27 are shown in the position they would occupy prior to the starting of the engine that drives the pump 14. Once the pump 14 starts pumping fluid through the pressure conduit 17, the fluid is pressurized at a pressure level established by the regulator valve 22 and is in continuous unrestricted communication with the chambers 36,37 and restricted communication with actuating chambers 31 and 32 through the orifices 33,34 respectively. With the solenoid valves 44,46 in the first position shown, a pressure drop occurs across the orifices 33,34 so that the fluid pressure in the actuating chambers 31,32 is less than the fluid pressure in the chambers 36,37. Consequently, the directional spools 26,27 are moved inwardly towards the central member 28 against the bias of the springs 38 to their second position at which the clutches are disengaged.

Engagement of the forward clutch 11, for example, is initiated by moving the switch 54 to the left energizing solenoid valve 44 causing it to move to the second position blocking the fluid flow through conduit 47. This causes the pressure in actuating chamber 31 to increase to a level equal to that in chamber 36. With the fluid pressure in chamber 36 and 31 being equal, the spring 38 then moves directional spool 26 to the first position at which communication between the pressure conduit 17 and clutch 11 is established.

If the shuttle spool 59 is not already in the first position as shown in the drawing, it will be moved to the first position in response to the actuating chamber 31 being pressurized due to the restricted flow through the second orificed passageway 63. At the first position of the shuttle spool, the actuating chamber 32 is vented to the reservoir and cannot then be pressurized sufficiently for actuating the directional spool 27 to the first position. Thus simultaneous engagement of both clutches is prevented.

To disengage the clutch 11, the switch 54 is moved back to the neutral position shown de-energizing the solenoid valve 44 so that it moves to the first position again communicating the actuating chamber 31 with the tank 13. As previously described, the pressure drop across orifice 33 decreases the pressure in actuating chamber 31 so that the fluid pressure in chamber 36 moves the directional spool 26 to the second position blocking communication between the pressure conduit 17 and the clutch 11 while connecting the clutch 11 with the drain conduit 18.

Engagement and subsequent disengagement of the reverse clutch 12 is accomplished in a similar manner by moving the switch 54 to the right to control movement of the directional spool 27 between its first and second position. The shuttle spool 59 will be moved to the second position venting the actuating chamber 31 to the reservoir 13.

In view of the foregoing, it is readily apparent that the structure of the present invention provides an improved fluid control system for controlling the actuation of two independent clutches. The solenoid valves which control pressurization of the actuating chambers which in turn controls movement of the directional spools are normally open so that a normal solenoid valve failure would cause disengagement of the clutch rather than engagement of the clutch as would occur with the normally closed solenoid valve. Thus, unexpected movement of the vehicle due to a leaky solenoid valve is prevented. Furthermore, the shuttle valve automatically communicates one of the actuating chambers with the reservoir in response to pressurization of the other actuating chamber, thereby preventing pressurization of both actuating chambers at the same time. This prevents simultaneous actuation of the directional spools and hence simultaneous engagement of both the forward and reverse clutches.

Other aspects, objects and advantages of this invention can be obtained from a study of the drawings, the disclosure and the appended claims.

I claim:

1. A fluid control system (10) for selectively controlling actuation of a pair of actuators (11,12) comprising:
    a reservoir (13);
    a pump connected to the reservoir (13);
    a control valve (16) connected to the pump (14) and having a pair of separate directional spools (26,27) slidably positioned therein, and a pair of actuating chambers (31,32) each chamber being disposed at one end of one of the directional spools, respectively (26,27), each of said directional spools being independently movable between a first position at which the pump (14) is in communication with one of the actuators (11,12) and a second position at which said one of the actuators is in communication with the reservoir (13), each of said directional spools being moved to said first position independent of the other directional spool in response to the associated actuating chamber (31,32) being pressurized;

means (43) for selectively pressurizing the actuating chambers (31,32); and means (57) for venting one of the actuating chambers (31,32) to the reservoir (13) in response to the other chamber (31,32) being pressurized so that simultaneous movement of the separate directional spools is prevented and only the directional spool associated with said other actuating chamber is moved to said first position, said means for venting (57) including a shuttle spool (59) having first and second passageways (62,63) defined therein, said shuttle spool being movable between a first position at which one of the first and second fluid passageways in the shuttle spool communicates one of the actuating chambers (31,32) with the reservoir (13) and a second position at which the other of said first and second passageways in the shuttle spool communicates said other of the actuating chambers (31,32) with the reservoir, said shuttle spool (59) being moved to the first position in response to said other of the actuating chambers (31,32) being pressurized and to said second position in response to said one of the actuating chambers being pressurized.

2. The fluid control system (10) of claim 1 wherein said control valve (16) has a bore (24) therein with said directional spools (26,27) slidably positioned within the bore, and a central member (28) fixedly positioned between the directional spools (26,27), said actuating chambers (31,32) each being positioned between the central member (28) and one of the directional spools (26,27).

3. The fluid control system (10) of claim 2 wherein said means for venting (57) includes a bore (56) in the central member (28), a vent passageway (61) connected to the bore (58) in the central member and to the reservoir (13), said shuttle spool (59) being slidably positioned with the bore (58) in the central member wherein the first passageway (62) communicates said one actuating chamber with the vent passageway (61) at the first position of the shuttle spool (59) and the second passageway (63) communicates said other actuating chamber with the vent passageway (61) at the second position of the shuttle spool (59).

4. The fluid control system (10) of claim 2 wherein said means for pressurizing (43) includes a pair of orifices (33,34) each connecting the pump (14) to a respective one of the actuating chambers (31,32), a pair of solenoid valves (44,46) connected to the actuating chambers (31,32), each solenoid valve being movable between a first position at which the associated actuating chamber (31 or 32) is in communication with the reservoir (13) and a second position at which the associated actuating chamber (31 or 32) is blocked from communication with the reservoir (13), each of said solenoid valves having a spring (51) normally biasing said solenoid valve to the first position.

5. The fluid control system (10) of claim 4 including a pair of springs (38) positioned within the actuating chambers (31,32) biasing the directional spools (26,27) to there first positions, and another pair of chambers (36,37) at the opposite ends of the directional spools (26,27) and being in continuous communication with the pump (14).

6. The fluid control system (10) of claim 4 wherein said means for venting (57) includes a bore (58) in the central member (28), a vent passageway (61) connected to the bore and to the reservoir (13), said shuttle spool being slidably positioned with the bore (58) in the central member wherein the first passageway (62) communicates said one actuating chamber with the vent passageway (61) at the first position of the shuttle spool (59) and the second passageway (63) communicates said other chamber with the vent passageway (61) at the second position of the shuttle spool, each of said passageways (62,63) being an orificed passageway being substantially equal to or larger than the orifices (33,34).

* * * * *